July 22, 1958  R. M. BATEMAN ET AL  2,844,327
PROCESS FOR PREPARING A MOLDABLE COMPOSITION
Filed March 12, 1954  2 Sheets-Sheet 1
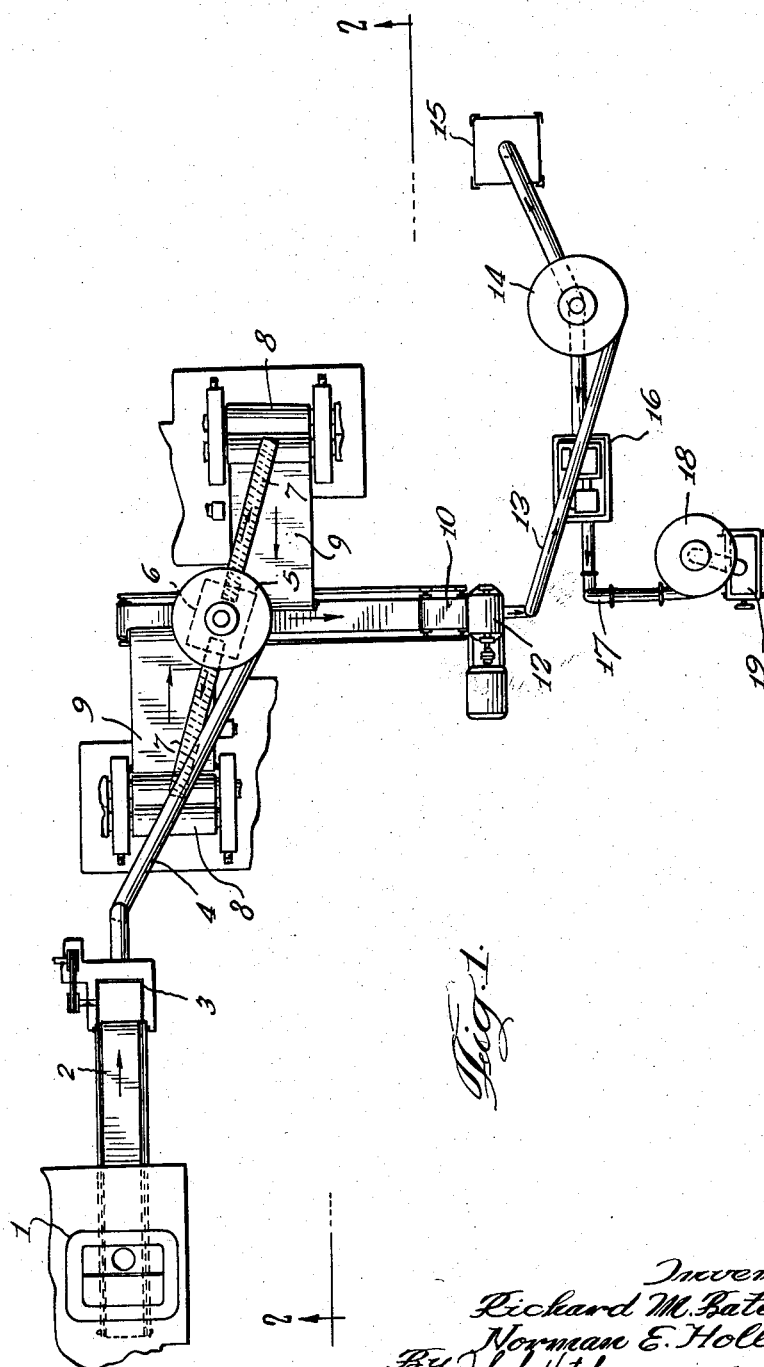

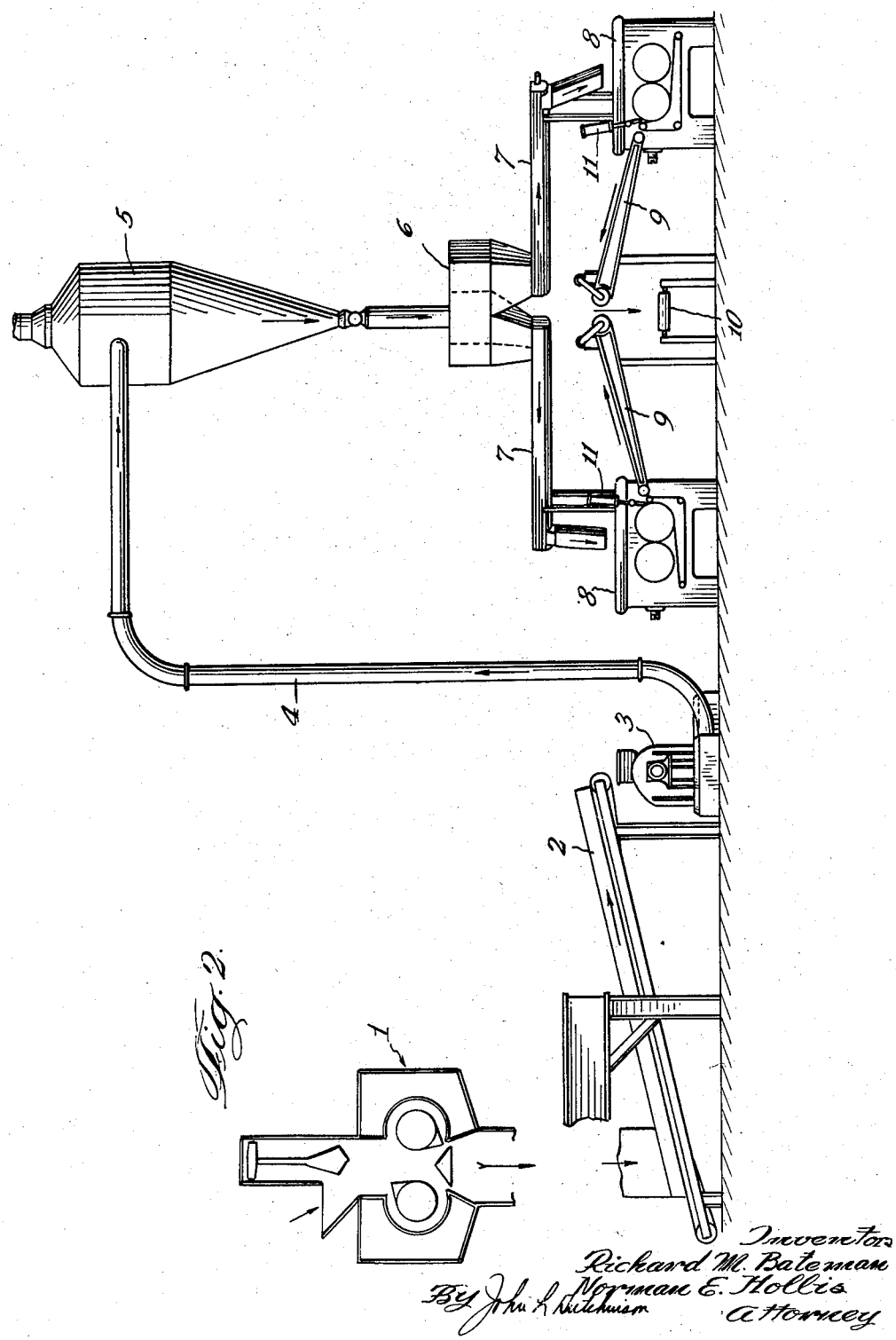

United States Patent Office 2,844,327
Patented July 22, 1958

2,844,327

PROCESS FOR PREPARING A MOLDABLE COMPOSITION

Richard M. Bateman, Berkley, and Norman E. Hollis, Westchester, Ill., assignors to The Richardson Company, Melrose Park, Ill., a corporation of Ohio Application March 12, 1954, Serial No. 415,872

11 Claims. (Cl. 241—3)

This invention relates to the formation of compositions which may be molded and set or cured by heat, and more particularly to a method for preventing the pre-curing of such compositions during their formation and prior to molding.

As is well known to those familiar with the art of molding, there are numerous compositions containing one or more thermosetting or heat-curable compounds as an ingredient thereof which may be employed to make a variety of molded products. Representative of thermosetting or heat curable compounds are natural rubber, neoprene (polychloroprene formed by polymerizing 2-chloro-1,3 butadiene), other synthetic rubbers such as butadiene-styrene and thermosetting resins, for example, the phenol-aldehyde resins. In general, thermosetting or heat curable compounds have what may be termed a critical temperature, above which a permanent change occurs in the compounds. Thus if such compounds are heated up to their critical temperature or above they will become permanently cured or set to a hardened condition. Upon subsequent cooling and re-heating after curing, no further change will occur. Thermosetting compounds are to be distinguished from compounds which are considered normally thermoplastic for the reason that compounds of the latter type can be continually heated and cooled and will accordingly soften and harden respectively.

In addition to the critical temperature characteristic of thermosetting or heat-curable compounds of the aforementioned type, the majority of such compounds have, in varying degrees, an additional time temperature characteristic known as "heat memory," wherein a permanent set or cure can be obtained at temperatures lower than critical temperatures, if such compounds are maintained at such lower temperatures for any appreciable length of time. For example, in the case of neoprene, it is generally considered that its critical temperature is in the neighborhood of 250° F. However, if neoprene is heated to something less than 250° F. such as 200° F., and this temperature is sustained for a given period of time, a permanent cure will take place equivalent to that obtained by heating the neoprene above its critical temperature.

In working neoprene, rubber, etc., with other materials to form a moldable composition, the problem of heat memory must be constantly considered for, as is the case in most mixing, working or compounding operations involving the preparation of molding compositions, heat is developed and if the heat is not removed, a condition known as "scorching" occurs. This condition of scorching is in effect a precuring and presents difficulties in further processing and molding such compositions. Neoprene is probably the most sensitive thermosetting compound in this respect, however, other heat curable compounds such as natural rubber, synthetic rubbers, etc. also present the same problem in varying degrees.

Compositions of the foregoing type which have been processed in accordance with prior practices not only present a problem of "scorching" while being processed but, in addition, as a result of the high heat history which they have acquired, also present a problem if stored for any extended period of time. Thus special precautions must be taken to insure that a minimum of additional heat history is acquired during storage and/or shipment to prevent pre-curing prior to use in molding operations. Further, additional problems are presented if accelerators are deemed desirable for molding purposes in that the combination of the heat-memory characteristic of such compositions and the accelerators enhances the tendency of the composition to pre-cure.

Accordingly, it is one object of the present invention to provide a process for making moldable compositions containing one or more thermosetting or heat curable compounds wherein the composition has a controlled heat history.

Another object is the provision of a process for controlling the heat history of compositions of the aforementioned type by rapidly and efficiently removing the heat which has been acquired by working operations.

A further object is to provide a substantially continuous process of forming moldable thermosetting or heat-curable compositions whose heat histories are appreciably less than those of similar compositions which have been processed in accordance with the standard operations of compounding and forming practiced by the prior art.

A still further object is to provide a more efficient and economical process for forming thermosetting or heat curable moldable compositions whereby larger quantities of such compositions may be processed in less time without accumulating a high heat history.

These and other objects will become more apparent by references to the following specification and the attached drawings.

In the drawing,

Figure 1 represents a diagrammatic plan of an apparatus arrangement which may be employed in accordance with the teachings of this invention.

Figure 2 is an elevational view taken on line 2—2 of Figure 1.

Numerous methods have been devised for overcoming the aforementioned heat memory or time-temperature characteristics in processing heat curable molding compositions. Such methods have been only moderately successful and have not been entirely satisfactory from a production standpoint. Thus, for example, compositions containing natural rubber have been mixed initially in a Banbury mixer without the addition of accelerators to prevent scorching, followed by a cooling step, usually comprising the use of cooling tables upon which the material is laid in slab form. After an appropriate cooling period, the composition is recycled through the mixing apparatus for the purpose of adding the accelerator. Such a process, although time consuming, permits the accelerator to be added at a lower initial temperature, thereby avoiding a pre-curing or scorching of the composition. Alternately, instead of re-cycling through the Banbury mixer, the composition may be cooled by placing it on cooling tables, followed by transferring the cooled composition to a mill where the accelerators are added. This process, however, is unsatisfactory for the reason that it results in inadequate dispersion of the accelerators.

While it is preferred to mix compositions containing thermosetting or heat-curable compounds in a Banbury type mixer because of its relative large capacity, there are certain disadvantages inherent in using an apparatus of this type. One disadvantage results from the form in which mixed compositions are discharged from the Banbury mixer. Thus, compositions so mixed are discharged in the form of large irregular chunks, the highest retained heat being in approximately the center of the chunk. After discharge from a Banbury mixer, the composition ordinarily requires further working before it can be molded and, accordingly, the composition is usually passed through a differential mill, where it is subjected to a shearing action. In the usual practice heretofore employed, the material, by necessity, is permitted to remain on a conveyor awaiting introduction into the mill for a period of time of between 5 to 25 minutes.

It will be appreciated that some portions of the batch discharged from the Banbury, when permitted to exist under elevated temperatures for such periods of time, will undergo the scorching or pre-curing referred to hereinabove. Thus, certain portions of the batch may be processed through the mill and cooled by placing on a cooling table within a short period of time, resulting in an adequate moldable composition, while other portions of the same batch, by remaining on the conveyor will be scorched and unsuited for molding. Another process which has been employed in the preparation of molding compositions comprises mixing smaller batches of a desired composition on a mill for the reason that the smaller batches are easier to control and present less of a problem with respect to accumulation of a high heat history. However, it can be appreciated that in general this latter process is time consuming and undesirable from an economical standpoint.

In describing the process of the present invention, which has been developed to overcome the foregoing disadvantages, reference will be made to an exemplary molding composition containing neoprene as one of the ingredients of a composition whose heat history is controlled. However, it will be appreciated that other compositions containing thermosetting or heat curable compounds as heretofore mentioned may be similarly treated.

The present invention consists in brief of a process wherein various ingredients of a particular composition are initially mixed homogeneously in an apparatus such as a Banbury mixer, followed by immediately comminuting the mass so formed, rapidly cooling the particles, subsequently re-working the particles to further disperse the ingredients of the composition, followed by again comminuting the resultant mass and rapidly cooling the particles. The cooling means employed comprises an enclosed air stream having preferably an ambient temperature into which the comminuted mass is introduced and thereby rapidly cooled.

The foregoing process may be semi-continuous or continuous depending on whether the initial ingredients are weighed, introduced into the mixer and discharged therefrom by automatic control mechanisms or by hand. However, it will be seen from the following description that once the initial batch has been introduced into the mixer further operations on the compositions may be completely automatic, the material moving from the mixer to each succeeding operation by conveyors, etc.

Referring now to the drawings, there is shown a Banbury mixing apparatus 1 which is of the usual type employed in the industry and into which are introduced the various ingredients comprising a particular composition. One composition which has been found suitable for molding battery cases or like articles, includes neoprene, together with modifiers, a filler and a small percentage of an accelerator, lubricant, etc., the quantities of each being varied in accordance with properties desired in the end product. These various ingredients are introduced into the Banbury in an appropriate sequence and are permitted to remain therein for a period of approximately six to ten minutes. In an exemplary system a Banbury mixer having a capacity of about 350 pounds may be employed and appropriate quantities of each of the ingredients can be added to make up a batch of this weight. The mixing operation causes the temperature of the mass to rise to about 210° F., this being the approximate maximum temperature desired when working with neoprene, in view of the fact that neoprene, as previously mentioned, is known to have a critical setting temperature of about 250° F. Following this initial operation in which the various ingredients are homogeneously mixed, the mass may be automatically discharged in the form of chunks to a conveyor 2 which carries the same to a grinder 3 commonly known as a "hog." This "hog" may be a Sprout-Waldron fully rotary cutter, having at its discharge outlet a ⅜ inch screen. The capacity of the "hog" is such that all of the 350 pound mass discharged from the Banbury may be passed to the "hog" within a total time of approximately 2 minutes. The "hog" comminutes the mass into small particles or granules preferably of about ¼ inch or less, and immediately introduces the particles into an enclosed air stream 4 at ambient temperature.

A suitable air stream may be established by means of a fourteen inch duct leading from the discharge end of the grinder wherein the air velocity is about 5000 foot per minute. Such an air stream is capable of conveying 170 pounds of the aforementioned comminuted material per minute. The air stream with its entrained particles is discharged into a cyclone collector 5 which may be a No. 18 Corona "S" type dust collector. As a result of the conveyance of the particles in the air duct and their subsequent swirling around in the cyclone collector the temperature of the particles is rapidly reduced to substantially that of the air stream, or within 10° thereof. In the exemplary embodiment of the invention wherein a composition containing neoprene is processed, the period of time between the introduction of a given portion of the mass into the grinder or "hog" and its subsequent cooling to substantially ambient temperature is only about thirty seconds. Thus all of the original 350 pound batch initially charged into the Banbury can be comminuted and cooled to approximately ambient temperature within about two and one half minutes from the time it is "dropped" from the Banbury.

After collection in the cyclone collector the cooled subdivided composition may be stored for extended periods of time as a result of the substantially reduced heat history. However, as previously indicated, the composition at this stage is generally not suitable for molding, but rather requires additional working to further disperse the ingredients. Accordingly, as the occasion demands, a portion or all of the original batch may be further worked by subjecting it to a milling operation. Preferably the cooled comminuted composition is introduced directly into subsequent operations, as indicated hereinafter, thereby providing a continuous operation, which is highly desirable from an economical and production standpoint.

From the cyclone collector 5 the cooled comminuted composition is permitted to fall into a storage hopper 6, which is divided into two sections for the purpose of feeding two screw conveyors 7. By appropriate control means, not shown, each of the screw conveyors are regulated so that they may alternately discharge, automatically, predetermined quantities, usually forty pounds, of the cooled comminuted composition onto a 60 inch differential rubber mill 8. The mill subjects the composition to a grinding and shearing operation for the purpose of additionally dispersing the ingredients and increasing the molding characteristics of the composition. Due to the work thus performed the temperature of the composition is again increased generally to about 180° F., the milling operation lasting for about two minutes for a forty pound batch. While on the mill the composition is formed into sheets which after an appropriate length of time may be automatically stripped from the mill by means of a hydraulically operated doctor knife 11. The sheets upon being stripped from the mill are transferred directly to conveyor 9 from which they are then transferred to conveyor 10. From conveyor 10 the sheets are passed into a second "hog" or grinder 12, for example, a Gruendler 3S24 shredder. This "hog" reduces the composition to small particles or granules of approximately ¼ of an inch or less. The particles so formed are then immediately introduced into a second enclosed air stream 13 having ambient temperatures and are conveyed therein to a second cyclone collector 14 wherein they are subject to a swirling motion, whereby the particles are reduced to a temperature approximating that of the air stream, or within 10° thereof. This second cooling means may consist of an air stream traveling at about 5000 ft. per minute in an 11 inch duct, the air stream being capable of carrying in the neighborhood of approximately 100 pounds per minute of comminuted material. The cyclone collector employed may be a No. 15 Corona "S" type dust collector. From the second cyclone collector 14 the particles are permitted to fall into a storage hopper 15 or are introduced directly into a subsequent molding process.

In the event that it is desired to mold immediately after the materials have been treated in the foregoing manner, the particles from the cyclone separator 14 may be passed to a grinding machine 16 such as the model K Fitzmill, wherein the composition is reduced to a powder suitable for molding. In view of the fact that the grinding operation causes a rise in temperature, the composition may be passed through a smaller cooling system comprising an enclosed air stream 17 which discharges into a third cycle separator 18, the material then being permitted to discharge into an appropriate receptacle 19 from which it is transferred to a molding apparatus. In molding a composition such as referred to hereinabove, which includes neoprene, filler, etc. in a compression type mold for making battery cases or similar products, it is generally desirable to have the composition at a temperature of between 160° to 220° F. with molding performed in heated molds wherein the mold temperatures may range from 300° to 375° F.

In lieu of employing a differential mill for further working and dispersing the ingredients, following their initial homogeneous mixing in the Banbury, as described above, an extruder type of mixer may be utilized. Such an extruder as that developed by Welding Engineers, and described in U. S. Patent 2,615,199, has been found suitable and highly desirable, in that due to the presence of reversed flights on the screws which are employed in a mixer of this type and because work is performed on small volume increments, a more intimate and controlled working operation can be obtained.

As a result of the process and apparatus described hereinabove thermosetting or heat curable molding compositions can be made having a substantially reduced and controlled heat history. Further, due to the rapid comminuting and cooling steps performed after both the mixing and milling operation, larger batches of ingredients forming a particular composition can be suitably worked for the desired periods of time at elevated temperature without fear of pre-curing or scorching, and the former practice of forming such compositions into slabs and placing the slabs on large metal tables to cool is eliminated. Additionally, by reason of the substantially reduced heat history of a given composition less concern need be had with respect to the employment of accelerators; and, correspondingly, molding compositions having extremely fast cures are obtainable for the reason that fast reacting resins and highly accelerated rubbers may be employed.

Another important achievement resulting from the present invention is the reduction in time for processing a given composition to a desired degree of dispersion. To process a given moldable composition in accordance with prior practices as compared to the process of the present invention took about six times as long and also resulted in compositions which had average heat histories up to ten times that of present compositions. Also, by thus rapidly processing a given batch of material all of the material has substantially the same heat history or degree of cure, which is of prime importance from a molding standpoint, in that the flow characteristics of such a composition can be more accurately controlled resulting in molded products having more uniform and desirable properties such as impact, tensile strength, etc.

While there has been shown and described an exemplary embodiment of the invention, the same is only intended to be limited by the scope of the following claims.

We claim:

1. A process for preparing a moldable heat-curable composition having a controlled heat history including initially mixing the ingredients comprising the composition at a gradually increasing temperature which approaches but is maintained below the critical temperature of said composition to form a homogeneous mass, comminuting said mass immediately after mixing to a predetermined particle size, immediately cooling said comminuted mass, subjecting said cooled comminuted mass to a working and shearing operation at an elevated temperature but below the critical temperature of said composition whereby the ingredients of the composition are further dispersed and intimately mixed and formed into a shaped plastic mass having an elevated temperature, comminuting said plastic mass to a predetermined particle size immediately after said working and shearing operation and immediately cooling the particles to remove the heat acquired during said working and shearing operation, whereby substantially all of the heat history of said composition is acquired during the initial mixing and the working and shearing operation.

2. A process as described in claim 1 wherein the ingredients of the composition are initially mixed as a batch and wherein successive portions of said batch after initial mixing and while in a cooled, comminuted state are subjected to said working and shearing operation.

3. A process according to claim 1 wherein each of the cooling operations comprises introducing the particles of the comminuted composition into an air stream having an appreciably lower temperature than that of the particles.

4. A process according to claim 3 wherein the air stream is supplied directly from the surrounding atmosphere and the temperature of the comminuted composition is reduced to a temperature which is within about 10° of that of the surrounding atmosphere.

5. A process according to claim 4 wherein the working and shearing operation is performed on a differential mill and the composition discharged therefrom as a sheet.

6. A process for preparing a moldable heat-curable composition having a controlled heat history, including the steps of initially mixing a batch of the ingredients comprising the composition into a homogeneous mass at a gradually increasing temperature which approaches but is maintained below the critical temperature of said composition, subdividing said mass immediately after mixing to a predetermined particle size, immediately introducing the particles into an air stream having an appreciably lower temperature to rapidly cool said particles, subjecting said particles to a differential milling operation for a fixed period at an elevated temperature but below the critical temperature of said composition and forming the same into sheets having an elevated temperature, removing said sheets from the mill at the end of said period, immediately subdividing said sheets to a predetermined particle size, and introducing the particles into a second air stream having an appreciably lower temperature immediately after subdividing to rapidly cool the same whereby substantially all of the heat history of said composition is acquired during the mixing and milling operations.

7. A process according to claim 6 wherein each of said air streams is supplied directly from the surrounding atmosphere and the particles are reduced to a temperature which is within about 10° of that of the surrounding atmosphere.

8. A process of preparing a heat-curable moldable composition containing polychloroprene having a controlled heat history, including the steps of homogeneously mixing the ingredients comprising the composition at a gradually increasing temperature not exceeding approximately 210° F., immediately comminuting the mixture, introducing said comminuted mixture immediately after comminuting into a gas stream at an appreciably lower temperature to rapidly cool the same, working said cooled comminuted mixture into a shaped plastic mass at elevated temperature but below the critical temperature of said polychloroprene to further disperse the ingredients of said composition, immediately comminuting this second mass, introducing said comminuted mass immediately after comminuting into a second gas stream at an appreciably lower temperature to rapidly cool the same whereby substantially all of the heat history of the composition is acquired during the mixing and working operations.

9. A process according to claim 8 wherein each of the cooling steps reduces the temperature of the particles of said composition to within about 10° of that of the surrounding atmosphere.

10. A process of preparing a heat-curable moldable composition containing polychloroprene having a relatively small heat history, including the steps of homogeneously mixing the ingredients comprising the composition at a temperature not exceeding approximately 210° F., subdividing the mixture immediately after mixing into particles having an average maximum dimension of about one-fourth of an inch, immediately introducing said particles into an air stream having a substantially lower temperature for a period of time sufficient to cool said particles to approximately the same temperature as said air stream, subjecting the cooled subdivided mixture to a differential milling operation at an elevated temperature but below the critical temperature of said polychloroprene to disperse the ingredients of the composition thereby forming a shaped plastic mass having an elevated temperature, again subdividing the composition immediately after said milling operation into particles having an average maximum dimension of about one-fourth of an inch, and immediately introducing the particles into a second air stream having a substantially lower temperature to rapidly reduce the heat acquired by the composition as a result of the milling operation.

11. A process according to claim 10 wherein the air stream has a temperature equivalent to that of the surrounding atmosphere and wherein both of the combined operations of subdividing and cooling are performed on a given portion of the composition within a total maximum time of approximately thirty seconds.

References Cited in the file of this patent

UNITED STATES PATENTS

| | | |
|---|---|---|
| 1,143,625 | Hechenbloikner | June 22, 1915 |
| 2,297,505 | Schmidberger | Sept. 29, 1942 |
| 2,319,040 | Conklin | May 11, 1943 |
| 2,335,515 | Jehle | Nov. 30, 1943 |
| 2,516,295 | Borton | July 25, 1950 |
| 2,524,751 | Berger | Oct. 10, 1950 |
| 2,615,199 | Fuller | Oct. 28, 1952 |
| 2,652,590 | Sullivan | Sept. 22, 1953 |

FOREIGN PATENTS

| | | |
|---|---|---|
| 649,249 | Great Britain | Jan. 24, 1951 |

OTHER REFERENCES

Mill Room of the Future, by Andrew Hale et al., published in India Rubber World, August 1, 1941, volume 104, Number 5, pages 33–38.

Synthetic Rubber, by Whitby, S. C. Lib. designation TS 1925 W45, pages 767, 774 and 775.